United States Patent [19]

Kamichika et al.

[11] 3,853,599

[45] Dec. 10, 1974

[54] PROCESS FOR ADHERING REINFORCING FIBERS AND RUBBER

[75] Inventors: Muraji Kamichika, Kawanishi; Yasuhiro Miyake, Takarazuka; Fumihiro Doura, Kawachinagano, all of Japan

[73] Assignee: Takeda Chemical Industries, Ltd., Osaka, Japan

[22] Filed: Dec. 4, 1972

[21] Appl. No.: 311,480

Related U.S. Application Data

[63] Continuation of Ser. No. 81,603, Oct. 16, 1970, abandoned.

[52] U.S. Cl. ... 117/76 T, 117/126 GB, 117/138.8 F, 156/332, 156/335, 260/29.3, 260/29.6 TA
[51] Int. Cl. ............................................. B32b 25/10
[58] Field of Search ............ 156/332, 335; 117/76 T, 117/161 UD, 161 UT, 161 L; 260/29.3, 29.6 TA

[56] References Cited
UNITED STATES PATENTS

| | | | |
|---|---|---|---|
| 2,819,237 | 1/1958 | Daniel | 260/29.3 X |
| 3,390,114 | 6/1968 | Uhl et al. | 260/29.6 TA |
| 3,419,463 | 12/1968 | Timmons | 117/76 T X |
| 3,516,897 | 6/1970 | Brodnyan | 156/335 X |
| 3,597,379 | 8/1971 | Van Valkenburg | 156/335 X |
| 3,663,268 | 5/1972 | Wilson | 156/335 X |

*Primary Examiner*—Ralph Husack
*Attorney, Agent, or Firm*—Fitzpatrick, Cella, Harper & Scinto

[57] ABSTRACT

A novel aqueous adhesive composition suitable for adhesion between papers, glasses, and between rubbers and reinforcing fibers in tires or belts comprises the aqueous dispersion which is produced from halooxyallkylester of unsaturated carboxylic acid and conjugated diolefin (conveniently together with ethylenically unsaturated compound) as starting monomers. The adhesive composition contains from 1.0 to 45 mol % of the halooxyalkyl ester and 40 mol % or more of the conjugated diolefin. The most favorable aqueous dispersion is a copolymer latex made from a combination of the halooxyalkylester and the diolefin or that from a combination of the halooxyalkylester, the diolefin and the ethylenically unsaturated compound. In adhesion between rubbers and reinforcing fibers, the aqueous dispersion is applied in a two steps processing together with a composition containing phenolformaldehyde primary condensate and rubber latex, or in one step processing, mixing with phenolformaldehyde primary condensate.

33 Claims, No Drawings

PROCESS FOR ADHERING REINFORCING FIBERS AND RUBBER

This is a continuation, of application Ser. No. 81,603, filed Oct. 16, 1970 now abandoned.

This invention relates to a novel aqueous adhesive composition comprising a diene polymer or a diene copolymer, and a process of adhesion by using the same. More particularly, this invention relates to an adhesive composition for tires or belts, which gives a strong adhesive strength between fibers and rubbers.

Molded rubber articles such as belts, hoses, tires, etc., are usually reinforced by fibrous materials such as cotton, rayon, vinylon, nylon, polyester, glass fiber, etc.. There have been made many attempts to improve the adhesive strength between these fibers and rubbers. However, most of the inventions such as a treatment method or an adhesive composition concerning the improvement of adhesive strength between such fibers and rubbers had drawbacks in adhesive strength, stability or flexibility of the treated article, or stability of an adhesive system. That is, the adhesion method or adhesives of the prior art have been unsatisfactory not only in adhesive strength, but also in many other respects as follows: adhesion strength degrades as the lapse of time; processability during adhesion operation is extremely lowered because of poor flexibility of processed fibers; dynamic adhesive strength of processed article is inferior; various phenomena are observed as the lapse of time such as an increase in viscosity of the adhesives system, both in a solvent system and in an aqueous dispersion system, gelation or degradation of adhesive strength. Recently, polyester fibers have become to be widely used as reinforcing fibers for rubbers. In order to improve poor adhesive strength obtained by using conventional adhesives, there have been suggested various methods such as a method wherein an isocyanate compound is used, or a method wherein an ethyleneimine compound is used or a method wherein an epoxy compound is used. A new method has been also found wherein 3-chloro-2-hydroxy propyl methacrylate is used together with an acrylic acid ester. These methods have also the drawbacks as mentioned above. Moreover, expensive and dangerous organic solvents are needed in these methods. The adhesion obtained thereby is satisfactory at lower temperatures, but not when under a heavy loading at higher temperatures during the running of tires.

The present inventors have now found that a strong adhesive can be achieved by using an adhesive composition containing a novel aqueous dispersed emulsion as hereinafter described. When said composition is applied to the fibers before adhesion with rubbers, a strong adhesion may be achieved between fibers and rubbers. The adhesion can be retained at higher temperatures as well as at normal temperatures, even under a heavy, long time prolonged loading at higher temperatures. It has also been found that the treated fibrous material keeps considerably high flexibility and that the drawbacks as mentioned above can wholly be overcome.

The aqueous dispersion as hereinafter described may be used alone to static adhesion between papers or glasses. It gives a film having excellent water resistance and oil resistance after subjected only to drying or heating without using other additives such as cross-linking agents. The elasticity of the film obtained is also extremely good. In carrying out an adhesion between rubbers and reinforcing fibers in tires, for example, two kinds of processings as shown below are proposed:

1. Two Steps Processing

According to this processing, the first step comprises a treatment of the reinforcing fibers with the present aqueous dispersion as hereinafter described, before heating. As the next step, the processed fibers are treated with a composition comprising a phenolformaldehyde primary condensate and a rubber latex (a copolymer latex of vinyl pyridine, styrene, butadiene and the like). They are heated again and, applying rubber coating thereto, vulcanized.

2. One Step Processing

According to this processing the treatment of the reinforcing fibers is accomplished in one step. A mixture of the aqueous dispersion as hereinafter described together with a phenol-formaldehyde primary condensate is applied onto the fibers.

According to the present invention, there are provided three types of adhesive composition. The first one comprises an aqueous dispersion wherein the solid component contains (A) a polymer of halooxyalkylester of unsaturated carboxylic acids represented by the formula $$RCO\text{-}OC_nH_{2n-m-P+1}X_m(OH)_P$$

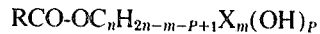

wherein RCO— represents an acid residual group of a polymerizable unsaturated fatty acid, X stands for a halogen, $n$ is an integer ranging from 3 to 12 and $m$ and P are integers ranging from 1 to 3, respectively) or a copolymer (A') of a compound represented by the formula (I) with an ethylenically unsaturated monomer, and (B) a polymer of a conjugated diolefin or (B') of the conjugated diolefin with the ethylenically unsaturated monomer.

Another type of adhesive composition comprises an aqueous dispersion wherein the solid component contains (A") a copolymer of the halooxyalkylester of unsaturated carboxylic acids represented by the above formula (I) with the cojugated diolefin. The other type of adhesive composition contains (C) a copolymer of said compound represented by the above formula (I) with the conjugated diolefin and the ethylenically unsaturated monomer. Any types of adhesive composition contains the monomeric units from said compound represented by the formula (I) in an amount ranging from 1.0 to 45 mol %, preferably from 1.5 to 30 mol % based on the total solid components, and the monomeric units of said conjugated diolefin in an amount of 40 mol % or more based on the total solid component.

Aqueous Dispersion

The aqueous dispersion used in the present invention may include six types of solid components as shown below:

1. [N]+ [D]
2. [N]+[D + E]
3. [N + E]+ [D]
4. [N + E]+ [D + E]
5. [N + D]
6. [N + D + E]

wherein

[N] is a polymer of the compound represented by the formula (I),

[D] is a polymer of the conjugated diolefin,

[E] is a polymer of the ethylenic monomer,

[N + D] is a copolymer of the compound represented by the formula (I) with the conjugated diolefin,

[N + E] is a copolymer of the compound represented by the formula (I) with the ethylenic monomer,

[D + E] is a copolymer of the conjugated diolefin with the ethylenic monomer, and

[N + D + E] is a copolymer of the compound represented by the formula (I) with the conjugated diolefin and the ethylenic monomer.

An amount of solid components in the aqueous dispersion is industrially preferably not less than 10 %, and more desirably 20 %. The aqueous dispersion contains as its solid components the monomeric units derived from the compound represented by the formula (I) in an amount ranging from 1.0 to 45 mol %, particularly preferably from 1.5 to 30 mol % based on the total solid components. It also contains the monomeric units derived from the conjugated diolefin in an amount of 40 mol % or more based on the total solid components. When the monomeric units derived from the conjugated diolefin are contained in an amount of 70 mol % or more, the dynamic adhesive strength is extremely enhanced.

The acidic residual group of the halooxyalkylester of unsaturated carboxylic acid represented by RCO— in the formula (I) set forth above is one of acidic residual groups of polymerizable unsaturated carboxylic acids. The group includes acrylic acid, methacrylic acid, itaconic acid, crotonic acid, cinnamic acid, fumaric acid, maleic acid, etc. Among these carboxylic acids, the dibasic carboxylic acids may be either in the form of half-esters, di-esters or mixtures thereof.

The halooxyalkyl group in the compound represented by the formula (I) may include 3-chloro-2-hydroxypropyl, 3-bromo-2-hydroxypropyl, 3,3,3-trichloro-2-hydroxypropyl, 3-bromo-2-hydroxy-1-methylpropyl, 5-chloro-2-hydroxypentyl, 3-bromo-2-hydroxy-1-ethylpropyl, 3-bromo-2-hydroxy-1,1-dimethylbutyl, 3-bromo-2-hydroxy-1-butylpropyl and the like.

The conjugated diolefin is, for example, butadiene, isoprene, chloroprene, etc.

The ethylenic monomer copolymerizable with the compound represented by the formula (I) and/or conjugated diolefin may include styrene, γ-methyl styrene, acrylonitrile, methacrylonitrile, alkyl methacrylate such as methyl methacrylate, ethyl methacrylate, etc. It may also include unsaturated acrylamides such as acrylamide, N-methylol acrylamide, N-methylated methylol acrylamide, methacrylamide, N-methylol methacrylamide, N-methylated methylol methacrylamide, etc. It may further include unsaturated acids such as acrylic acid, methacrylic acid, itaconic acid, etc., substituted acrylic acid esters or methacrylic acid esters such as hydroxyethyl acrylate, hydroxyethyl methacrylate, glycidyl methacrylate, etc. Further, many other vinyl compounds such as vinyl acetate, vinyl pyridine, etc., may also be included.

Suitable monomers may be selected among the compounds represented by the formula (I), conjugated diolefin and ethylenic monomers as set forth above. They may be varied widely both in species and amounts according to the purpose of the aqueous dispersion of the present invention.

The aqueous dispersion used in the present invention may be easily produced industrially by conventional emulsion polymerization technique. Most of the conventional emulsifiers and stabilizers may be available for the polymerization. Species and amounts of such emulsifiers and stabilizers to be used depend on the monomers and the purpose or the use of the composition. Among such emulsifiers are generally included anionic surface active agents such as fatty acid salts, resin acid salts, alkylaryl sulfonates, alkyl sulfates, salts of napthalene sulfonic acid-formaldehyde condensates, salts of dialkylsulfosuccinate, sulfates of polyoxyethylene alkylaryl ether, salts of alkylphenoxy ethylsulfonate, salts of sulfonated oils, salts of alkyl phosphate, salts of alkylaryl phosphate, salts of polyoxyethylene alkylaryl phosphate or the like. The emulsifiers to be used may also include nonionic surface active agents such as polyoxyethylene alkylaryl ether, polyoxyethylene alkyl ether, polyoxyethylene alkyl ester, sorbitane derivatives or the like. They may further include cationic surface active agents such as quaternary ammonium salts or the like and even amphoteric surface active agents such as betaine type surface active agents. At least one of these surface active agents may be used.

Other additives such as polymerization initiators or polymerization modifiers which may be used conventionally in the emulsion polymerization of styrene-butadiene rubber (SBR) may also be available in producing the latex of the present invention.

The polymerization initiators include inorganic or organic per-compounds such as persulfates and perborates of alkali metals, hydroperoxide such as cumene hydroperoxide, paramenthane hydroperoxide or the like. They may also include redox system such as a combination of ammonium persulfates, hydroperoxides or the like together with ferrous ion, pyrosulfites, bisulfites, formamidine, sulfinic acid, sodium formaldehyde sulfoxylate or the like.

Examples of the polymerization modifiers which may be generally used in the present invention are long chain alkyl mercaptan, dialkyl xanthogenate disulfide or the like. Favorable results are obtained in some cases if the polymerization modifiers are added at the intermediate stage of the polymerization reaction. Of course, they may also be added at the outset of the polymerization reaction.

All the monomer components may be present in the reaction system when the polymerization is initiated. In order to cary out said polymerization reaction more uniformly or on account of some special purposes, one or more of the monomeric components may be added to the reaction system during the polymerization reaction. Graft polymerization method may be also available for producing the latex of the present invention.

The aqueous dispersion according to the present invention may be improved by adding a rubber latex and-/or a blocked isocyanate compound thereto. That is, one or more species of compounds selected from the rubber latex and the blocked isocyanate compounds may be added to the aqueous dispersion in an amount ranging from 5 to 150 % by weight based on the solid components of the aqueous dispersion. The result whereby obtained is that an adhesive strength is extremely improved. Further result is that no degradation is seen in static adhesive strength or dynamic adhesive strength, even if fibers are procssed at lower temperatures.

Rubber latices which may be added to the aqueous dispersion include natural rubber latex, polyisoprene latex, SBR latex, vinyl pyridine copolymer latex, polychloroprene latex, acrylonitrilebutadiene (NBR) latex, butyl rubber latex and the like or mixtures thereof. The aforesaid blocked isocyanate compound is produced from a reaction between a compound having mono-, di-, tri- or poly-isocyanate group and a blocking agent. Examples of the isocyanate compounds are monoisocyanates such as alkyl monoisocyanate, unsaturated alkyl monoisocyanate, aliphatic monoisocyanates, or the like; diisocyanates such as tetramethylene diisocyanate, hexamethylene diisocyanate, phenylene diisocyanate, tolylene diisocyanate, diphenylmethane diisocyanate, or the like; triisocyanates such as diphenylmethane triisocyanate, triphenylmethane triisocyanate, or the like. There may also be included buret polyisocyanate of a trimer of diisocyanate such as tolylene diisocyanate (TDI), a polyisocyanate obtained from a reaction between a compound having 3 or more active hydrogens in a molecule and a diisocyanate compound, and the like. The blocking agents to be used may be phenols, tertiary alcohols, aromatic amines, active methylene compounds, lactams, ureas, oximes, bisulfites, and the like.

Any suitable coating method of adhesives may be applied according to the shape and the state of the articles. For example, such methods as immersion, coating by a roll coater, coating by spray or the like may be used. Viscosity increasing agents or fillers may be used, if desired, in order to control coating characteristics. For the purpose of drying and hardening of the adhesives after coating, heat treatment of processing at a temperature ranging from normal temperature to 300°c, preferably from 150° to 250°C, is preferred. The strong adhesion owes to a polar effect of halogens and hydroxyl groups contained in the composition of the present invention. The adhesive strength is further increased by the heat treatment as described above. Hence, the improvement of other properties such as water resistance or oil resistance may be also expected.

The adhesive composition of the present invention may be directly used for the purpose of static adhesion between the same kinds or different kinds of various materials, including organic or inorganic fibrous materials such as papers, threads, fibers, cloths, non-woven cloths, glass fibers, asbestos or the like; leather, woods, plywood, glasses, natural or synthetic rubbers, natural or synthetic resins, metals, ceramics, and the like.

The adhesive composition can further be used in the following modes, so far as dynamic adhesion in tires and belts, for example, are concerned.

I. Two Steps Processing

This processing comprises two steps of treatment. The first step is a treatment of the reinforcing fibers with the aqueous dispersion as described above. A mixture of the aqueous dispersion together with a rubber latex and/or a blocked isocyanate compound may also be used in place of the aqueous dispersion. The processed fibers are then heated and subjected to the next step. The second step is the treatment of the preprocessed fibers with a composition comprising a phenol-formaldehyde primary condensate and a rubber latex (a copolymer latex of vinyl pyridine, styrene and butadiene). The treated fibers are then heated. After applying rubber coating on the fibers, the rubber is vulcanized. The two steps processing provdes an extremely strong and stable adhesion between rubbers and reinforcing fibers.

The fibers include cotton, rayon, nylon, vinylon, polyester, glass fiber and the like. They may be in any form such as threads, codes, cloths, non-woven cloths, sheets, felts, mats, boards, or the like.

The phenol-formaldehyde primary condensate may include condensates obtained from reactions between formaldehyde and one or more of the compounds such as phenol, hydroxy benzoic acid, resorcin, catecol, trihydroxybenzene, alkyl-substituted derivatives thereof, halogen-substituted derivatives thereof haloalkyl-substituted derivatives thereof, or the like. These condensates may be modified by tris-(2-hydroxyethyl)isocyanurate or the like. The rubber latex in said composition may include natural rubber latex, SBR type rubber latex, vinylpyridine copolymer latex, polychloroprene type rubber latex, NBR type rubber latex, butyl rubber type latex or mixtures thereof.

The rubbers may be any kind of either natural or synthetic rubbers. They may be used in any kind of shapes and forms.

The processing for adhering fibers to rubbers will be explained in more detail. The fibers are first processed with the aforesaid aqueous dispersion by methods such as immersion, coating or the like. The processed fibers are then heated at a temperature, usually, from about 100° to about 250+C for 20 to 500 seconds. If the fibers are such heat-resistant ones as glass fibers, the temperature may be higher over that range. It is preferred to control the amount of the adhered solid components (DPU) to about 1 – 10 % by weight based on the weight of each fiber. The preprocessed fibers are further treated with the composition comprising a phenol-formaldehyde primary condensate and a rubber latex, and then heated. The heating temperature is preferred to be in the range from about 100° to about 250°C for 20 to 500 seconds. The fibers thus processed are coated with rubbers and then vulcanized.

In the treatment of fibers with the composition containing the phenol-formaldehyde primary condensate and rubber latex, it is preferred to control the amount of the adhered solid components (DPU) to about 1 – 10 % by weight based on the weight of each fiber.

II. One Step Processing

This processing comprises treating the fibers with an adhesive composition containing a mixture of the aqueous dispersion as described above and phenol-formaldehyde primary condensates. Said mixture may also contain a rubber latex and/or a blocked isocyanate compound. The phenol-formaldehyde primary condensates may be contained in said mixture in an amount of 3 – 30 parts based on 100 parts of the aqueous dispersion (calculated as solid component).

The fibers, the phenol-formaldehyde primary condensates, and the rubber latex are same as those mentioned in the preceding two steps processing.

According to this one step processing, the fibers are processed with the adhesive composition as described above by such methods as immersion, coating or the like. The processed fibers are then subjected to heat treatment at about 150° – 250°C for 20 to 500 seconds.

After heating, the fibers are coated with rubbers and then vulcanized. When the fibrous material is treated with this adhesive composition, it is preferred to control the amount of the adhering solid components at about 1 – 10 % by weight based on the weight of each fiber.

The present invention will be further described in more detail by referring to the following Examples. It should be understood, however, that these Examples are shown only for illustrative purposes and the scope of the present invention will not be restricted thereto.

EXAMPLE 1

A copolymer dispersion was prepared by an emulsion polymerization at 20°C according to the following recipe:

| Components | Parts by weight |
|---|---|
| Butadiene | 50 |
| 3-chloro-2-hydroxy propyl methacrylate | 50 |
| n-dodecyl mercaptan | 0.2 |
| Sodium dodecylbenzene sulfonate | 3.0 |
| Potassium chloride | 0.2 |
| Demol T (sodium salt of condensate of formaldehyde-naphthalene sulfonic acid) | 1.0 |
| Sodium formaldehyde sulfoxylate | 0.1 |
| Tetra-sodium salt of ethylenediamine tetra-acetic acid | 0.01 |
| Ferrous chloride | 0.001 |
| Cumene hydroperoxide | 0.1 |
| Water | 150 |

The viscosity of the dispersion obtained was increased up to 3,000 CPS by adding ammonium casein. The dispersion thickened was then coated on an aluminum foil in thickness of 0.02 mm. Immediately thereafter, a paper was layed thereon and dried at 100°C, while the brimm of the adhered specimen was pressed in order to prevent curling. The adhesion between the aluminum foil and the paper was so good that the paper was wholly torn out when it was peeled off. This adhesive composition was also excellent in elasticity, water resistance and oil resistance. When a smilar test was conducted by using styrene-butadiene rubber modified by carboxylic acids, the adhesive strength was rather weak, i.e. the adhesion breaking area was about 50%.

EXAMPLE 2

A copolymer dispersion was prepared by using the same method as in Example 1 except that parts of butadiene and 3-chloro-2-hydroxy propyl methacrylate were 25 and 75 respectively.

The viscosity of the dispersion obtained was increased up to about 10,000 CPS by adding aqueous sodium polyacrylate. It was then coated on a paper and dried at normal temperature. It was thereafter layed on a polyester film, pressed and subjected to heat-treatment at 150°C for 5 minutes. The adhesion was excellent and the paper layer was entirely broken when it was peeled off. The adhered layer was also excellent in elasticity, water resistance and oil resistance. When a similar test was conducted by using styrene-butadiene rubber modified by carboxylic acids, the ahdered layer was easily peeled off.

EXAMPLE 3

A copolymer dispersion was prepared by using the same method as described in Example 1 except that 3-chloro-2-hydroxy propyl acrylate was used instead of 3-chloro-2-hydroxy propyl methacrylate.

A piece of plain weave fabric was immersed with the dispersion obtained. The excessive dispersion was squeezed off from the fabric by putting between filtrating papers until the fabric contain 20% (calculated as solid components) of the adhered dispersion. it was then subjected to heat treatment at 150°C for several minutes, and adhered to a plasticized polyvinyl chloride by topping method. The polyvinyl chloride used was plasticized according to the following recipe:

| | |
|---|---|
| Polyvinyl chloride (average degree of polymerization is about 1,000) | 100 |
| Dioctyl phthalate | 45 |
| Dibutyl phthalate | 20 |
| Lead stearate | 1.5 |
| Natural calcium carbonate | 15 |

For comparative purpose, polyvinyl chloride leather was prepared by treating a plain weave fabric, using a polyvinyl chloride paste underlayer treatment method. The peeling strength of the former sample was 7 kg/cm, while that of the latter was 5 kg/cm.

EXAMPLE 4

A copolymer dispersion was prepared by using the same method as described in Example 1 except that parts of butadiene and 3-chloro-2-hydroxy propyl methacrylate were 60 and 40 respectively. The dispersion obtained was then compounded according to the following recipe:

| Dispersion compound blending recipe (ratio by weight of solid components) | |
|---|---|
| Dispersion | 100 |
| Precipitated calcium carbonate | 150 |
| Dispersing agents (Sodium pyrophosphate) | 2.0 |
| Antioxidant (styrenated phenol) | 1.0 |
| Water | Amount to adjust for 50 % by weight based on total solid components |

The viscosity of the dispersion compound was increased up to 12,000 CPS by adding aqueous sodium polyacrylate (compound A). Similarly, another latex compound was prepared by using styrenebutadiene rubber modified by carboxylic acids according to the same recipe (compound B). The compounds A and B were respectively coated on a vinylon canvas (0.5 mm thick). Immediately, another vinylon canvas was layed each coated cloth, which was then subjected to pressure adhesion by roll at linear pressure of 200 g/cm. Heat treatment of each specimen was conducted at 150°C for 10 minutes. The peeling strength of compound A was 1.7 kg/cm-width, while that of B was 1.2 kg/cm-width.

EXAMPLE 5

A copolymer dispersion was prepared by using the same method as described in Example 1 except that 70 parts of butadiene, 27 parts of 3-chloro-2-hydroxy propyl acrylate and 3 parts of acrylic acid were used.

A strand of glass filaments were immersed with the dispersion obtained. Twisting of the filaments was conducted while they were wet. They were then subjected to drying backing at 200°C for 3 minutes. The ratio of adhered solid components was 5 %. Similar treatment was also carried out by using styrene-butadiene latex. Tensile strength, abrasion strength according to Shimazu's Amsler type fiber adhesion tester and flexing resistance (strength kept for $10^4$ times repeated flexing) were measured. The result obtained is as follows:

|  | Tensile strength | Abrasion strength | Flexing resistance |
|---|---|---|---|
| Original filament (without treatment) | 37 kg/end | 35 times | 15 % |
| SBR treatment | 40 kg/end | 150 times | 80 % |
| Present method | 45 kg/end | 250 times | 90 % |

EXAMPLE 6

An aqueous dispersion was prepared by an emulsion polymerization at 50°C according to the following recipe:

| Components | Parts by weight |
|---|---|
| 3-Chloro-2-hydroxy propyl methacrylate | 15.0 |
| Styrene | 15.0 |
| Butadiene | 70.0 |
| t-Dodecyl mercaptan | 0.2 |
| Sodium alkylbenzene sulfonate | 5.0 |
| Cumene hydroperoxide | 0.05 |
| Sodium formaldehyde sulfoxylate | 0.3 |
| Tetra sodium ethylenediamine tetra acetate | 0.01 |
| Ferrous sulfate | 0.001 |
| Potassium chloride | 0.5 |
| Water | 180.0 |

The total solid content was controlled to 20 % by weight by adding deionized water to the aqueous dispersion obtained (solid content, 35.0 %). Polyester tire cords of 1,000 d/2 was dipped into this liquid and then subjected to heat treatment at 240°C for 90 seconds in an oven.

On the other hand, resorcin-formaldehyde primary condensate (hereinafter referred to as RF) and a composition containing resorcin-formaldehyde primary condensate and rubber latex (hereinafter referred to as RFL) were prepared according to the recipes shown below.

| RF aqueous solution | Parts by weight |
|---|---|
| Resorcin | 11.0 |
| Formaldehyde (37 %) | 16.0 |
| NaOH (10 %) | 1.0 |
| Water | 120.0 |
| Aging: 25°C, 6 hours | |

| RFL aqueous solution | Parts by weight |
|---|---|
| RF aqueous solution | 147.1 |
| Butadiene-vinyl pyridine-styrene terpolymer latex (solid content: 40%) | 200.0 |
| Butadiene-styrene copolymer latex (solid content: 40 %) | 50.0 |
| Water | 160.0 |
| Aging: 25°C, 20 hours | |

The preprocessed cord was then dipped into the RFL solution. It was then treated by heating at 200°C for 90 seconds in an oven. This cord was adhered to unvulcanized rubber by pressure and thereafter the rubber was vulcanized at 142°C for 45 minutes. The measurement of the adhesive strength was carried out at 120°C according to the U-test method (Rubber Chem. & Technology 42, 243, No, 1, (1969)).

The rubber used in the above Example was composed of the following ingredients:

|  | Parts by weight |
|---|---|
| Natural rubber | 60 |
| SBR 1500 | 40 |
| RPA No. 2 (peptizer) | 0.25 |
| Anigene RD (hydroquinoline-type antioxidant agent, produced by Sumitomo Chemical Co., Ltd.) | 1.0 |
| Retarder | 0.35 |
| Pine tar | 3.0 |
| SRF black | 20.0 |
| Stearic acid | 4.0 |
| Zinc oxide | 5.0 |
| Soxinol CZ (sulfenamide type accelerator, produced by Sumitomo Chemical Co., Ltd.) | 1.0 |
| Soxinol D (guanidine type accelerator, produced by Sumitomo Chemical Co., Ltd.) | 0.1 |
| Sulfur | 3.0 |
| Vulcanization condition 142°C. 45 minutes | |

Note: SBR: Styrene-butadiene rubber
RPA No. 2: a mixture of 33.3 % of naphthyl-β-mercaptan and 66.7 % of nonreactive hydrocarbon, produced by du-Pont
Antigene RD: Polymer of 2,2,4-trimethyl-1,2-dihydroquinoline
Retarder: Polymerized N-nitroso trimethyl dihydroquinoline
SRF: Semi reinforcing furnace black

EXAMPLE 7

An emulsion polymerization was carried out in the same manner as described in Example 6 except that 30.0 parts by weight of 3-chloro-2-hydroxy propyl methacrylate and 70.0 parts by weight of butadiene were used as monomeric components. An adhesive composition was prepared by using this dispersion and SBR latex according to the following formulation.

| Adhesive composition | Parts by weight |
|---|---|
| Dispersion (35 %) | 171.4 |
| SBR-2108 (40 %) | 100.0 |
| Water | 228.6 |

Polyester cord of 1,000 d/2 was dipped into this composition and subjected to heating at 240°C for 90 seconds. The processed cord was thereafter dipped into RFL in Example 6 and then subjected to heating at 200°C for 90 seconds. This preprocessed cord was then pressed to unvulcanized rubber and ahesion was completed by vulcanization method. The adhesive strength thereof was measured according to the U-test method (at 120°C).

EXAMPLE 8

An emulsion polymerization was carried out in the same manner as described in Example 6 except that 15.0 parts by weight of 3-chloro-2-hydroxy propyl methacrylate and 85.0 parts by weight of butadiene were used as monomeric components. An adhesive composition was prepared by adding to this dispersion an aqueous dispersion (solid content: 20 %) containing phenol-blocked compounds of TDI.

| Adhesive composition | Parts by weight |
| --- | --- |
| Dispersion (35 %) | 257.1 |
| Blocked TDI with phenol (20.0 %) | 50.0 |
| Water | 192.9 |

Polyester cord of 1,000 d/2 was dipped into this composition and subjected to heating at 200°C for 90 seconds. The treated cord was thereafter dipped into RFL in Example 6 and then subjected to heating at 200°C for 90 seconds. The adhesive strength of this processed cord was measured according to the U-test method (at 120°C).

EXAMPLE 9

An emulsion polymerization was carried out in the same manner as described in Example 6 except that 15.0 parts by weight of 3-chloro-2-hydroxy propyl acrylate, 15.0 parts by weight of styrene and 70.0 parts by weight of butadiene were used as monomeric components. The solid content of this emulsion was controlled to 20 % by adding thereto deionized water. Polyester cord of 1,000 d/2 was dipped into this liquid and subjected to heating at 240°C for 90 seconds. The processed cord was thereafter dipped into RFL in Example 6 and then subjected to heating at 200°C for 90 seconds. The adhesive strength of the processed cord was measured according to the U-test method (at 120°C).

EXAMPLE 10

An emulsion polymerization was carried out in the same manner as described in Example 6 except that 10.0 parts by weight of 3-chloro-2-hydroxy propyl methacrylate, and 90.0 parts by weight of butadiene were used as monomeric components. An adhesive composition was prepared by adding to this dispersion a SBR latex and a phenol-blocked compound of TDI.

| Adhesive composition | Parts by weitht |
| --- | --- |
| Dispersion (35 %) | 143.0 |
| SBR 2108 (40 %) | 100.0 |
| Blocked TDI with phenol (20 %) | 50.0 |
| Water | 207.0 |

Polyester tire cord of 1,000 d/2 was dipped into this composition and subjected to heating at 220°C for 90 seconds. It was thereafter dipped into RFL in Example 6 and then heated at 200°C for 90 seconds. The adhesive strength of this cord was measured according to the U-test method (at 120°C).

EXAMPLE 11

An emulsion polymerization was carried out in the same manner as described in Example 6 except that 60.0 parts by weight of 3-chloro-2-hydroxy propyl methacrylate and 40.0 parts by weight of butadiene were used as monomeric components, The solid content of this dispersion was controlled at 20 % by adding thereto deionized water. Polyester tire cord was treated by using this dispersion and RFL according to the same procedure as described in Example 6. The adhesive strength of the processed cord was measured according to the U-test method (at 120°C).

EXAMPLE 12

A dispersion was produced according to the same procedure as described in Example 6 except that 100 parts by weight of 3-chloro-2-hydroxy propyl methacrylate was used as the sole component. A mixture containing 142.9 parts by weight of this dispersion and 125.0 parts by weight of SBR 2108 was prepared. It was then diluted by adding deionized water to a concentration containing 20 % by weight of solid content. Using this mixed dispersion and RFL in Example 6, the same procedure as described in Example 6 was repeated. The adhesive strength was measured according to the U-test method (at 120°C).

EXAMPLE 13

A dispersion was produced according to the same procedure as described in Example 6 except that 30 parts by weight of 3-chloro-2-hydroxypropyl methacrylate and 70 parts by weight of methyl methacrylate were used as monomeric components. A mixture containing 114.1 parts by weight of this dispersion and 150 parts by weight of SBR 2108 was prepared. It was then diluted by adding deionized water to a concentration containing 20 % by weight of solid content. Using this mixed dispersion and RFL in Example 6, the same procedure as described in Example 6 was repeated. The adhesive strength was measured according to the U-test method (at 120°C).

EXAMPLE 14

A mixture containing 142.9 parts by weight of the dispersion of Example 13 and 83.3 parts by weight of natural rubber latex (60 %) was prepared. It was then diluted by adding deionized water to a concentration containing 20 % by weight of solid content. Using this mixed dispersion and RFL in Example 6, the same procedure as described in Example 6 was repeated. The adhesive strength was measured according to the U-test method (at 120°C).

EXAMPLE 15

A dispersion was produced according to the same procedure as described in Example 6 except that 30.0 parts by weight of 3,3,3-trichloro-2-hydroxy propyl methacrylate, 70.0 parts by weight of butadiene were used as the monomeric components. The content of total solid components of this dispersion was controlled to 20 % by adding thereto deionized water. Polyester tire cord was treated by using this dispersion according to the same procedure as described in Example 6. The adhesive strength of the processed cord was measured according to the U-test method (at 120°C).

A dispersion was produced according to the same procedure as described in Example 6 except that 10.0 parts by weight of 3-chloro-2-hydroxypropyl methacrylate, 10.0 parts by weight of styrene, 80.0 parts by weight of isoprene were used as the monomeric components. The content of total solid components of this dispersion was controlled to 20 % by adding thereto deionized water. Polyester tire cord was treated by using this dispersion according to the same procedure as described in Example 6. The adhesive strength of the processed cord was measured according to the U-test method (at 120°C).

The results of measurement of adhesive strength and hardness of the processed cord obtained in Examples 6–16 are shown in the following Table. for comparative purpose, there is shown a result of measurement of adhesive strength and hardness of the processed cord when polyester tire cord (1,000 d/2) is treated only with RFL in Example 6 without the pretreatment of the present invention. There is also shown a result of measurement of adhesive strength and hardness of the processed cord when polyester tire cord (1,000 d/2) is subjected to pretreatment with a commercially available epoxy-type compound and then treated with RFL in Example 6.

| Examples | Cord | Adhesive strength*[1] (n=10) | Hardness*[2] |
|---|---|---|---|
| 6 | Polyester | 10.5 kg | 2,600 mg |
| 7 | do. | 10.7 | 2,700 |
| 8 | do. | 10.9 | 3,300 |
| 9 | do. | 10.5 | 2,500 |
| 10 | do. | 10.9 | 3,100 |
| 11 | do. | 10.6 | 3,900 |
| 12 | do. | 10.5 | 4,100 |
| 13 | do. | 9.7 | 3,900 |
| 14 | do. | 10.0 | 4,050 |
| 15 | do. | 10.6 | 3,600 |
| 16 | do. | 10.7 | 2,900 |
| Without pretreatment | do. | 3.8 | 1,800 |
| Pretreatment with epoxy-type compound | do. | 10.1 | 4,050 |

*[1] The adhesive strength shown in the Table is the average value when the measurement is repeated 10 times.
*[2] Stiffness is measured by using Gurley's stieffness tester.

EXAMPLE 17

An aqueous dispersion containing 35 % of solid components was obtained according to the same polymerization procedure as described in Example 6 except that 15.0 parts by weight of 3-chloro-2-hydroxy propyl methacrylate and 85.0 parts by weight of butadiene were used as the monomeric components.

RF primary condensate was prepared according to the following recipe.

| RF primary condensate recipe | Parts by weight |
|---|---|
| Resorcin | 11.0 |
| Formaldehyde (37 %) | 16.3 |
| Caustic soda (10 %) | 3.0 |
| Water | 235.7 |
| Aging: 25°C, 6 hours | |

Adhesive composition (A) was prepared by using the aqueous dispersion and the RF primary condensate according to the following formulation.

| Adhesive composition (A) | Parts by weight |
|---|---|
| RF aqueous solution | 266.0 |
| Aqueous dispersion (35 %) | 85.7 |
| VP latex (40 %) | 175.0 |
| Water | 60.3 |
| Aging: 25°C, 20 hours | |

Nylon tire cord (840 d/2) was dipped into the adhesive composition (A) and thereafter heated at 200°C for 90 seconds in an oven. During said heat treatment the cord was stretched at about 10 %. The ratio of solid components adhered thereby was about 1.5 %. This cord was then pressed onto unvulcanized rubber (whose composition was the same as shown in Example 6). Then, vulcanization was carried out at 142°C for 45 minutes. The adhesive strength was measured according to the U-test method (at 120°C).

EXAMPLE 18

An aqueous dispersion containing 35 % of solid components was obtained according to the same polymerization procedure as described in Example 6 except that 60.0 parts by weight of butadiene and 40.0 parts by weight of 3-chloro-2-hydroxy propyl methacrylate were used as the monomeric components. An adhesive composition (B) was prepared by using the aqueous dispersion and the Rf primary condensate as shown below.

| RF primary condensate | Parts by weight |
|---|---|
| Resorcin | 11.0 |
| Formaldehyde (37 %) | 16.0 |
| Caustic soda (10 %) | 1.0 |
| Water | 235.0 |
| Aging: 25°C, 20 hours | |

| Adhesive composition (B) | Parts by weight |
|---|---|
| RF aqueous solution | 263.0 |
| Aqueous dispersion (35 %) | 85.7 |
| VP latex | 175.0 |
| Water | 60.0 |
| Aging: 25°C, 20 hours | |

Polyester tire cord 1,000 d/2 was dipped into the adhesive composition (B) and then heated at 240°C for 90 seconds. The ratio of solid components adhered thereby was about 1.0 %. This processed cord was thereafter subjected to the same treatment as described in Example 17. The adhesive strength was measured according to the U-test method (at 120°C). Further, this processed cord was allowed to stand for 2 weeks at room temperature. The same treatment as described in Example 17 was applied thereto and the adhsive strength was measured similarly.

EXAMPLE 19

An aqueous dispersion containing 35 % of solid components was obtained according to the same polymerization procedure as described in Example 6 except that 40.0 parts by weight of butadiene and 60.0 parts by weight of 3-chloro 2-hydroxy propyl methacrylate were used as monomeric components. An adhesive composition (C) was obtained by mixing the aqueous dispersion together with the RF primary condensate recipe as shown in Example 18.

| Adhesive composition (C) | Parts by weight |
|---|---|
| RF aqueous solution | 263.0 |
| Aqueous dispersion (35 %) | 85.7 |
| SBR 2109 (40 %) | 175.0 |
| Water | 60.0 |

Polyester tire cord (1,000 d/2) was dipped into the adhesive composition (C) and subjected to heat treatment in an oven at 240°C for 90 seconds. The adhesive strength of this processed cord was measured according to the U-test (at 120°C).

EXAMPLE 20

| RF primary condensate recipe | Parts by weight |
|---|---|
| Resorcin | 4.4 |
| Formaldehyde (37 %) | 6.6 |
| Caustic soda (10 %) | 1.0 |
| Water | 235.0 |
| Aging: 25°C, 6 hours | |

An adhesive composition (D) was prepared by mixing the aqueous dispersion (solid content: 35 %) obtained according to the polymerization method described in Example 18, a TDI-phenol blocked compound, and the RF primary condensate of the recipe set forth above. Said mixing was carried out according to the following recipe.

| Adhesive composition (D) | Parts by weight |
|---|---|
| RF aqueous solution | 247.0 |
| Aqueous dispersion (35 %) | 85.7 |
| VP latex (40 %) | 175.0 |
| TDI-phenol blocked compound (20 %) | 50.0 |
| Water | 25.5 |
| Aging: 25°C, 20 hours | |

Polyester tire cord (1,000 d/2) was dipped into the adhesive composition (d) and subjected to heat treatment at 220°C for 90 seconds. The adhesive strength of this processed cord was measured according to the U-test method (at 120°C).

EXAMPLE 21

An aqueous dispersion was prepared according to the same polymerization recipe as shown in Example 6 except that 70.0 parts by weight of butadiene 15.0 parts by weight of 2-vinyl pyridine, and 15.0 parts by weight of 3-chloro- 2-hydroxy propyl methacrylate were used as the monomeric components. The aqueous dispersion was then mixed with the RF primary condensate of which recipe is shown in Example 20 to obtain an adhesive composition (E).

| Adhesive composition (E) | Parts by weight |
|---|---|
| RF aqueous solution | 247.0 |
| Aqueous dispersion (35 %) | 285.7 |
| Water | 2.3 |
| Aging: 25°C, 20 hours | |

Polyester tire cord (1,000 d/2) was dipped into the adhesive composition and subjected to heat treatment in an oven at 240°C for 90 seconds. The adhesive strength of this processed cord was measured according to the U-test method (at 120°C).

EXAMPLE 22

An aqueous dispersion was prepared according to the same polymerization recipe as shown in Example 6 except that 30.0 parts by weight of 3-chloro- 2-hydroxypropyl acrylate and 70.0 parts by weight of butadiene were used as the monomeric components. An adhesive composition (F) was prepared by using the aqueous dispersion and the RF primary condensate as shown below.

| RF primary condensate | Parts by weight |
|---|---|
| Resorcin | 3.3 |
| Formaldehyde (37 %) | 7.3 |
| Caustic soda (10 %) | 2.0 |
| Water | 235.0 |

| Adhesive composition (F) | Parts by weight |
|---|---|
| RF aqueous solution | 247.6 |
| Aqueous dispersion (35 %) | 55.7 |
| VP latex | 175.0 |
| Water | 60.0 |
| Aging: 25°C, 20 hours | |

Polyester tire cord (1,000 d/2) was dipped into the adhesive composition (F) and thereafter subjected to heat treatment in an oven at 240°C for 90 seconds. The adhesive strength of the processed cord was measured according to the U-test method (at 120°C). The amount of the solid components adhered to the cord was about 3 % by weight.

EXAMPLE 23

An aqueous dispersion was prepared according to the same polymerization recipe as shown in Example 6 except that 100 parts by weight of 3-chloro-2-hydroxypropyl methacrylate was used as the monomeric component. The aqueous dispersion contained 35 % by weight of solid components. An adhesive composition (G) was prepared by using the aqueous dispersion and the RF primary condensate as shown below.

| RF primary condensate | Parts by weight |
|---|---|
| Resorcin | 13.2 |
| Formaldehyde (37 %) | 36.8 |
| Caustic soda (10 %) | 1.0 |
| Water | 235.0 |

| Adhesive composition (G) | Parts by weight |
|---|---|
| RF aqueous solution | 286.0 |
| Aqueous dispersion (35 %) | 42.8 |
| VP latex (40 %) | 160.0 |
| SBR 2108 (40 %) | 52.5 |
| Water | 60.0 |
| Aging: 25°C, 20 hours | |

Polyester tire cord (1,000 d/2) was dipped into the adhesive composition (G) and thereafter heated in an oven at 240°C for 90 seconds. The amount of the solid components adhered to the cord was about 1.0 % by weight. The adhesive strength of this processed cord was measured according to the U-test method (at 120°C).

EXAMPLE 24

An aqueous dispersion was prepared according to the same polymerization recipe as shown in Example 6 except that 30 parts by weight of 3-chloro-2-hydroxy propyl methacrylate and 70.0 parts by weight of methyl methacrylate were used as monomeric components. An adhesive composition (H) was prepared by mixing the aqueous dispersion together with natural rubber latex (60 %) and the RF primary condensate of which recipe is as shown in Example 18.

| Adhesive composition (H) | Parts by weight |
|---|---|
| RF aqueous solution | 263.0 |
| Aqueous dispersion (35 %) | 142.9 |
| Natural rubber latex (60 %) | 83.3 |
| Water | 60.0 |
| Aging: 25°C, 20 hours | |

Polyester tire cord (1,000 d/2) was dipped into the adhesive composition (H) and thereafter heated in an oven at 240°C for 90 seconds. The amount of the solid components adhered to the cord was about 1.0 % by weight. The adhesive strength of this processed cord was measured according to the U-test method (at 120°C).

EXAMPLE 25

An adhesive composition (I) was prepared by mixing the aqueous dispersion of Example 24 together with VPL (40 %) and the RF primary condensate of which recipe is as shown in Example 18.

| Adhesive composition (I) | Parts by weight |
|---|---|
| RF aqueous solution | 263.0 |
| Aqueous dispersion (35 %) | 102.9 |
| VP latex (40 %) | 150.0 |
| Water | 60.0 |
| Aging: 25°C, 20 hours | |

Polyester tire cord (1,000 d/2) was dipped into the adhesive composition (I) and thereafter heated in an oven at 240°C for 90 seconds. The amount of the solid components adhered to the cord was about 1.0 % by weight. The adhesive strength of this processed cord was measured according to the U-test method (at 120°C).

EXAMPLE 26

A dispersion was prepared according to the same polymerization recipe as shown in Example 6 except that 20.0 parts by weight of 3-chloro-2-hydroxypropyl methacrylate, 10.0 parts by weight of styrene and 70.0 parts by weight of isoprene were used as the monomeric components. The dispersion (solid content: 35 % was then mixed with the RF primary condensate of which recipe is as shown in Example 18 to obtain an adhesive composition (J).

Polyester cord (1,000 d/2) was dipped into the adhesive composition (J) and thereafter subjected to heat treatment in an oven at 240°C for 90 seconds. The adhesive strength of the processed cord was measured according to the U-test method (at 120°C).

Adhesive strength and stiffness of the processed cords in Examples 17 – 26 will now be shown in the following Table. Stiffness of cords was measured by using Gurley's stiffness tester. For comparison, adhesive strength was also measured of a commercially available polyester tire cord (already applied one step treatment with epoxide compound) which was treated with a mixture containing RFL, vinyl pyridine copolymer latex and SBR latex.

| Example | Cord | Treatment temperature | Adhesive* strength (n=10) | Stiffness*** |
|---|---|---|---|---|
| 17 | Nylon | 200°C | 10.9 kg | 2100 mg |
| 18 | Polyester | 240°C | 10.8 (10.6)** | 2800 |
| 19 | do. | do. | 10.6 | 3200 |
| 20 | do. | 220°C | 10.8 | 3300 |
| 21 | do. | 240°C | 10.4 | 2600 |
| 22 | do. | do. | 10.7 | 2500 |
| 23 | do. | do. | 10.5 | 4100 |
| 24 | do. | do. | 9.8 | 3600 |
| 25 | do. | do. | 9.9 | 3700 |
| 26 | do. | do. | 10.8 | 3050 |
| Commercial product of polyester cord | do. | 200°C | 10.1 | 4050. |

* Adhesive strength shown in the above table is the average value when the measurement is repeated 10 times of U-test at 120°C.
** The value in the parenthesis is the adhesive strength after two weeks.
*** Stiffness is measured by using Gurley's stiffness tester.

What we claim is:
1. A process for adhering reinforcing fibers and rubber which comprises:
   1. coating the fibers with an adhesive composition which consists essentially of an aqueous dispersion of a solid polymer containing (a) from 1.0 to 45 mole %, based on the total solids content in said aqueous dispersion, of monomer units of a halooxyalkylester of an unsaturated carboxylic acid of the formula:

$$RCO-O(C_nH_{2n}\sim_{m-p+}X_m)(OH)_p$$

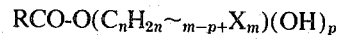

wherein RCO represents the acid residual group of a polymerizble unsaturated carboxylic acid, X represents a halogen atom, $p$ and $m$ represent positive integers of 1 to 3 and $n$ is a positive integer of 3 to 12, and (b) at least 40 mole %, based on the total solids content in said aqueous dispersion, of monomer units of a conjugated diolefin;
   2. heating the coated fibers of step (1);
   (3) treating the fibers of step (2) by contacting said fibers of step (2) with a second composition comprising (a) a phenolformaldehyde primary condensate and (b) a second dispersion of a copolymer of vinyl pyridine, styrene and butadiene;
   4. heating the treated fibers of step (3);
   5. applying said rupper to the heated fibers of step (4); and
   6 vulcanizing said rubber.

2. The process of claim 1 wherein said polymer is a copolymer of said ester and said conjugated diolefin or is a mixture of a homopolymer of said ester and a homopolymer of said conjugated diolefin.

3. The process of claim 2 wherein the content of monomer units of said ester in said polymer is from 1.5 to 30 mole %, based on the total solids content in said aqueous dispersion.

4. The process of claim 2 wherein the content in said polymer of said monomer units of said conjugated diolefin is at least 70 mole %, based on the total solids content in said aqueous dispersion.

5. The process of claim 1 wherein said polymer contains an amount of a copolymerizable ethylenically-unsaturated monomer and is a mixture of a copolymer of said ester with said unsaturated monomer and a homopolymer of said conjugated diolefin, or a mixture of a copolymer of said diolefin with said unsaturated monomer and a homopolymer of said ester, or a mixture of a copolymer of said ester with said unsaturated monomer and a copolymer of said conjugated diolefin with said unsaturated monomer or a copolymer of said ester, said conjugated diolefin and said unsaturated monomer.

6. The process of claim 5 wherein the content of monomer units of said ester in said polymer is from 1.5 to 30 mole %, based on the total solids content in said aqueous dispersion.

7. The process of claim 5 wherein the content in said polymer of said monomer units of said conjugated diolefin is at least 70 mole %, based on the total solids content in said aqueous dispersion.

8. The process of claim 5 wherein said copolymerizable ethylenically-unsaturated monomer is selected from the group consisting of styrene, α-methyl styrene, acrylonitrile, methacrylonitrile, alkyl methacrylates, unsaturated acrylamides, unsaturated acids, substituted acrylic acid esters, substituted methacrylic acid esters, vinyl acetate and vinyl pyridine.

9. The process of claim 1 wherein the solids content in said aqueous dispersion is at least 10%.

10. The process of claim 1 wherein said unsaturated carboxylic acid is selected from the group consisting of acrylic acid, methacrylic acid, itaconic acid, crotonic acid, cinnamic acid, fumaric acid, and maleic acid.

11. The process of claim 1 wherein the halooxyalkyl group of said ester is selected from the group consisting of a 3-chloro-2-hydroxypropyl group, a 3-bromo-2-hydroxypropyl group, 3,3,3-trichloro-2-hydroxypropyl group, 3-bromo-2-hydroxy-1-methylpropyl group, a 5-chloro-2-hydroxypentyl group, a 3-bromo-2-hydroxy-1-ethylpropyl group, a 3-bromo-2-hydroxy-1,1-dimethylbutyl group and a 3-bromo-2-hydroxy-1-butylpropyl group.

12. The process of claim 1 wherein said conjugated diolefin is butadiene, isoprene or chloroprene.

13. The process of claim 1 wherein said aqueous dispersion also contains from 5 to 150% by weight, based on the weight of said solid polymer, of at least one member selected from the group consisting of a natural or synthetic rubber latex and a blocked isocyanate compound.

14. The process of claim 1 wherein the heating in said steps (2) and (4) is conducted at a temperature of from 150° to 250°C.

15. The process of claim 1 wherein said halooxylalkyl ester is selected from the group consisting of 3-chloro-2-hydroxypropyl methacrylate, 3-chloro-2-hydroxypropyl acrylate and 3,3,3-trichloro-2-hydroxypropyl methacrylate.

16. A process for adhering reinforcing fibers and rubbere which comprises:
1. coating the fibers with an adhesive composition which consists essentially of a mixture of (A) an aqueous dispersion of a solid polymer containing (a) from 1.0 to 45 mole %, based on the total solids content in said aqueous dispersion, of monomer units of a halooxyalkyl ester of an unsaturated carboxylic acid of the formula:

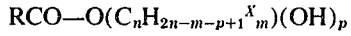

wherein RCO represents the acid residual group of a polymerizable unsaturated carboxylic acid, X represents a halogen atom, $p$ and $m$ represent positive integers of 1 to 3 and $n$ is a positivie integer of 3 to 12, and (b) at least 40 mole %, based on the total solids content in said aqueous dispersion, of monomer units of a conjugated diolefin, and (B) from 3 to 30 parts by weight, per 100 parts by weight of said solid polymer, of a phenol-formaldehyde primary condensate;
2. heating the coated fibers of step (1);
3. applying said rubber to the heated fibers of step (2); and
4. vulcanizing said rubber.

17. The process of claim 16 wherein said polymer is a copolymer of said ester and said conjugated diolefin or is a mixture of a homopolymer of said ester and a homopolymer of said conjugated diolefin.

18. The process of claim 17 wherein the content in said polymer of said monomer units of said conjugated diolefin is at least 70 mole %, based on the total solids content in said aqueous dispersion.

19. The process of claim 17 wherein the content in said polymer of said monomer units of said ester is from 1.5 to 30 mole %, based on the total solids content in said aqueous dispersion.

20. The process of claim 16 wherein said polymer contains an amount of a copolymerizable ethylenically-unsaturated monomer and is a mixture of a copolymer of said ester with said unsaturated monomer and a homopolymer of said conjugated diolefin, or a mixture of a copolymer of said diolefin with said unsaturated monomer and a homopolymer of said ester, or a mixture of a copolymer of said ester with said unsaturated monomer and a copolymer of said conjugated diolefin with said unsaturated monomer or a copolymer of said ester, said conjugated diolefin and said unsaturated monomer.

21. The process of claim 20 wherein the content, in said polymer, of said monomer units of said ester is from 1.5 to 30 mole %, based on the total solids content in said aqueous dispersion.

22. The process of claim 20 wherein the content in said polymer of said monomer units of said conjugated diolefin is at least 70 mole %, based on the total solids content in said aqueous dispersion.

23. The proces of claim 20 wherein said copolymerizable ethylenically-unsaturated monomer is selected from the group consisting of styrene, α-methyl styrene, acrylonitrile, methacrylonitrile, alkyl methacrylates, unsaturated acrylamides, unsaturated acids, substituted acrylic acid esters, substituted methacrylic acid esters, vinyl acetate and vinyl pyridine.

24. The process of claim 16 wherein the solids content in said aqueous dispersion is at least 10%.

25. The process of claim 16 wherein said unsaturated carboxylic acid is selected from the group consisting of acrylic acid, methacrylic acid, itaconic acid, crotonic acid, cinnamic acid, fumaric acid, and maleic acid.

26. The process of claim 16 wherein the halooxyalkyl group of said ester is selected from the group consisting of a 3-chloro-2-hydroxypropyl group, a 3-bromo-2-hydroxypropyl group, 3,3,3-trichloro-2-hydroxypropyl group, 3-bromo-2-hydroxy-1-methylpropyl group, a 5-chloro-2-hydroxypentyl group, a 3-bromo-2-hydroxy-1-ethylpropyl group, a 3-bromo-2-hydroxy-1,1-dimethylbutyl group and a 3-bromo-2-hydroxy-1-butylpropyl group.

27. The process of claim 16 wherein said conjugated diolefin is butadiene, isoprene or chloroprene.

28. The process of claim 16 wherein said aqueous dispersion also contains from 5 to 150% by weight, based on the weight of said solid polymer, of at least one member selected from the group consisting of a natural or synthetic rubber latex and a blocked isocyanate compound.

29. The process of claim 16 wherein said heating step (2) is conducted at 150° to 250°C for 20 to 500 seconds.

30. The process of claim 16 wherein the amount of said adhesive composition coated onto said fibers is from 1 to 10% by weight, based on the weight of said fibers.

31. The process of claim 16 wherein said halooxyalkyl ester is selected from the group consisting of 3-chloro-2-hydroxypropyl methacrylate, 3-chloro-2-hydroxypropyl acrylate and 3,3,3-trichloro-2-hydroxypropyl methacrylate.

32. A process for adhering reinforcing fibers and rubber which comprises:
 1. coating the fibers with an adhesive composition which consists essentially of an aqueous dispersion of a solid polymer whose monomer units consist essentially of (a) 1.5 to 30 mole %, based on the total polymer solids, of a halooxyalkyl ester of an unsaturated carboxylic acid of the formula:

$$RCO-O(C_nH_{2n-m-p+1}X_m)(OH)_p$$

wherein RCO represents the acid residual group of a polymerizable unsaturated carboxylic acid, X represents a halogen atom, $p$ and $m$ represent positive integers of 1 to 3 and $n$ is a positive integer of 3 to 12, (b) at least 70 mole %, based on the total polymer solids of a conjugated diolefin, and optionally (c) an amount of a copolymerizable ethylenically-unsaturated monomer, said polymer being (i) a mixture of homopolymers of (a) and (b), (ii) a mixture of a homopolymer of (a) and a copolymer of (b) and (c), (iii) a mixture of a copolymer of (a) and (c) and a homopolymer of (b), (iv) a copolymer of (a) and (b), (v) a mixture of a copolymer of (a) and (c) and a copolymer of (b) and (c) or (vi) a copolymer of (a), (b) and (c);
 2. heating the coated fibers of step (1) at an elevated temperature of up to 300°C to dry and harden said adhesive composition;
 3. treating the fibers of step (2) by contacting said fibers of step (2) with a second composition comprising (a) a phenol-formaldehyde primary condensate and (b) a second dispersion of a copolymere of vinyl pyridine, styrene and butadiene;
 4. heating the treated fibers of step (3);
 5. applying said rubber to the heated fibers of step (4); and
 6. vulcanizing said rubber.

33. A process for adhering reinforcing fibers and rubber which comprises:
 1. coating the fibers with an adhesive composition which consists essentially of a mixture of (A) an aqueous dispersion of a solid polymer whose monomer units consist essentially of (a) 1.5 to 30 mole %, based on the total polymer solids, of a halooxyalkyl ester of an unsaturated carboxylic acid of the formula:

$$RCO-O(C_nH_{2n-m-p+1}X_m)(OH)_p$$

wherein RCO represents the acid residual group of a polymerizable unsaturated carboxylic acid, X represents a halogen atom, $p$ and $m$ represent positive integers of 1 to 3 and $n$ is a positive integer of 3 to 12, (b) at least 70 mole %, based on the total polymer solids of a conjugated diolefin, and optionally (c) an amount of a copolymerizable ethylenically-unsaturated monomer, said polymer being (i) a mixture of homopolymers of (a) and (b), (ii) a mixture of a homopolymer of (a) and a copolymer of (b) and (c), (iii) a mixture of a copolymer of (a) and (c) and a homopolymer of (b), (iv) a copolymer of (a) and (b), (v) a mixture of a copolymer of (a) and (c) and a copolymer of (b) and (c) or (vi) a copolymer of (a), (b) and (c), and (B) from three to 30 parts by weight, per 100 parts by weight of said solid polymer, of a phenol-formaldehyde primary condensate;
 2. heating the coated fibers of step (1) at 150° to 250°C for 20 to 500 seconds;
 3. applying said rubber to the heated fibers of step (2);
 4. vulcanizing said rubber.

* * * * *